United States Patent Office 3,105,268
Patented Oct. 1, 1963

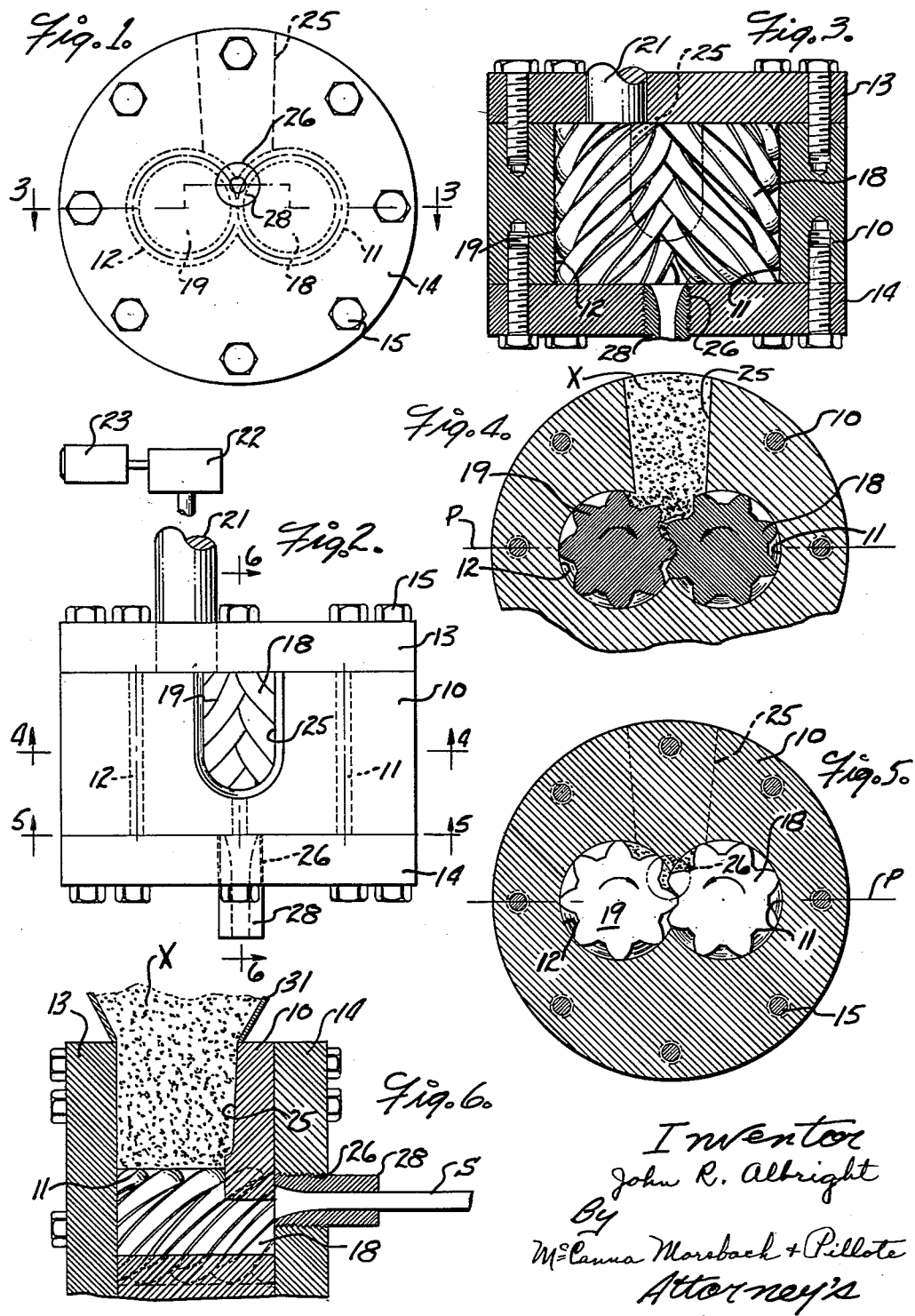

3,105,268
APPARATUS FOR EXTRUDING PLASTIC MATERIALS
John R. Albright, Athens, Ga., assignor to Roper Hydraulics, Inc.
Filed Sept. 11, 1961, Ser. No. 137,289
4 Claims. (Cl. 18—12)

This invention relates to apparatus for extruding plastic materials particularly to an apparatus for compacting powdered plastic materials and for extruding the same in the form of long continuous shapes.

Powdered plastic materials have heretofore been extruded using either the so-called wet process in which the powdered plastic is premixed with suitable solvents, or the hot-dry process in which the powdered material is heated during extrusion to form a melt extrusion. The continuous extrusion of polytetrafluoroethylene, however has presented particular problems. Because of its general insolubility in known organic solvents and plasticizers, and the lack of thermoplasticity and ability to be plasticized, the above described wet and hot-dry extrusion procedures are not successful in extruding polytetrafluoroethylene. Instead, it is now the practice to cold compact the finely divided polytetrafluoroethylene powder into a compact mass, usually with the admixture of an extrusion aid such as naptha and the compacted powder is then heated to a relatively high temperature of the order of 700 to 750° F. to sinter the powder.

At present, the polytetrafluoroethylene powder is compacted in a ram type extruder. However, difficulties have been encountered in attempting to continuously compact the powder in the form of long continuous shapes involving more material than can be loaded into the ram cavity. It has been found that the polytetrafluoroethylene powder is very sensitive to internal shear and that at once the powder has started to compact, it should be done in the quickest manner and across the shortest distance possible with a minimum of working of the powder during compaction. As such, the conventional spur gear pumps and the conventional screw pumps are not entirely satisfactory for compacting polytetrafluoroethylene powder.

An important object of this invention is to provide an improved apparatus for continually compacting and extruding polytetrafluoroethylene powder to form long continuous shapes.

Another object of this invention is to provide an extruding apparatus including a pair of interengaging spiral gears and having an improved arrangement for feeding the material to the gears and for discharging the compacted material therefrom to minimize working of the powdered material by the gears during compaction and to effect compaction while moving the material through a relatively short distance.

The present invention is characterized by the provision of a pair of interengaging spiral gears in which the material inlet port is located intermediate the ends of the gears at that side of the plane through the gear axis at which the gears move into meshing engagement, and the discharge port is located adjacent one end of the spiral gears also at the side of the plane through the gear axis at which the gears move into meshing engagement, so that the material from the inlet port is fed longitudinally of the gears to the outlet and does not pass around the outer periphery of the gears.

These, together with various ancillary objects and advantages of this invention will be more readily appreciated as the same becomes better understood by reference to the following detailed description when taken in connection with the accompanying drawings wherein:

FIG. 1 is an end elevational view of the apparatus for compacting and extruding powdered plastic material;

FIG. 2 is a top plan view of the apparatus;

FIG. 3 is a horizontal sectional view taken on the plane 3—3 of FIG. 1;

FIG. 4 is a transverse sectional view taken on the plane 4—4 of FIG. 2;

FIG. 5 is a transverse sectional view taken on the plane 5—5 of FIG. 2; and

FIG. 6 is a fragmentary longitudinal sectional view taken on the plane 6—6 of FIG. 2.

Referring more specifically to the accompanying drawings, the compacting and extruding apparatus includes a pump casing 10 having parallel intersecting bores 11 and 12 therein and end walls 13 and 14 at opposite ends of the casing. The end walls are secured to the casing as by fasteners 15 and extend across the ends of the pump bores to define a pumping chamber therein. A pair of interengaging spiral gears 18 and 19 are disposed in the pump bores 11 and 12 in meshing engagement with each other and a drive shaft 21 is connected to at least one of the pump gears and extends outwardly through one end wall such as 13. As diagrammatically shown in FIG. 2, the drive shaft 21 is connected through a gear mechanism 22 to a drive means such as a motor 23 which operates to drive the gears at a relatively low speed preferably of the order of 12 to 15 r.p.m.

The interengaging gears 18 and 19 rotate in relatively opposite directions and, as best shown in FIG. 3, are formed with a relatively high helix angle. The helix angle is made sufficiently high to have all of the pumping action occur at the meshing side of the gears while still low enough to enable the use of a self-driving pair of gears that do not have excessive end thrust. A helix angle of the order of about 45° has been found satisfactory. The interengaging gear teeth are in full meshing engagement when they reach the plane designated P through the axis of the gears, and the gears are rotated in the direction indicated by the arrows in FIGS. 4 and 5 so that the gear teeth move into meshing engagement at one side of the plane P, preferably the upper side as shown in the drawings, and move out of engagement at the other or lower side of the plane P.

In accordance with the present invention, the powdered plastic material to be compacted is fed to the interengaging gears and discharged therefrom in such a manner that the material flows longitudinally of the gears and does not flow around the gear peripheries, to thereby minimize the agitation of working of the powdered plastic material during compaction, and to also effect compaction of the material while moving the same through a relatively short distance and in a generally continuous operation. For this purpose, the inlet opening or port designated 25 is formed in the pump casing 10 to intersect the pump bores 11 and 12 intermediate the ends thereof and at the side of the plane P at which the gears 18 and 19 move into meshing engagement. The helical gear teeth when rotated in the directions indicated by the arrows in FIGS. 4 and 5, tend to advance the material from the inlet port 25 longitudinally of the pump bore in the direction toward the end plate 14, and a discharge port 26 is formed in the end plate to communicate with the pump bores at the side of the plane P at which the gear teeth move into meshing engagement. The powdered plastic material from the inlet 25 is thus advanced longitudinally of the pump bores in the intertooth spaces to the outlet port 26, and, as best shown in FIG. 3, the inlet port 25 is spaced axially from the outlet port a sufficient distance such that the gear teeth always maintain a running seal between the inlet and outlet ports. As is apparent, the material in the intertooth spaces is not pressurized substantially while the intertooth spaces communicate with the inlet port 25. However, as the material is advanced in the intertooth spaces toward the discharge port 26, it reaches the region between the inlet and discharge ports where the gear teeth seal the intertooth spaces from the inlet port. Thus, as the gear teeth move into meshing engagement, the material in the tooth spaces that are sealed from the inlet port is compressed and forced under pressure through the discharge port. In order to prevent this material which is under pressure from flowing in the intertooth spaces around to the unmesh side of the gears, and to also effect compaction of the material in the shortest possible distance, the spacing between the inlet port and the discharge port is made very short compared to the lead of the spiral gear teeth, as is clearly shown in FIGS. 3 and 6. As shown, a venturi shaped extruding nozzle 28 is mounted in the outlet port for shaping the compacted powdered plastic materials. As is well known, the configuration of the extruding nozzle will vary with the different continuous shapes to be formed and for forming tubing a central mandrel (not shown) is provided in the extruding die while a guider (not shown) is provided for guiding a wire through the circular extruder die, when the extrusion apparatus is used for coating wire. Such different extruding dies are well known and the details thereof form no part of the present invention and further description or illustration is therefore deemed unnecessary.

While the extrusion apparatus is generally adapted for extruding powdered plastic materials, it is particularly adapted for compacting and extruding powdered polytetrafluoroethylene. This material is very sensitive to shear and, as such, will partially set and make a poor discontinuous extrusion unless the extruding is done in a substantially continuous operation. As is conventional, the powdered polytetrafluoroethylene is preferably premixed with an extrusion aid such as naphtha and the premixed powder designated X is then fed in generally continuous fashion from a hopper 31 into the inlet of the extrusion apparatus. The walls of the bores 11 and 12 form a close running fit with the gear peripheries and the powdered plastic material therefore does not flow around the gear peripheries but instead flows longitudinally of the intermeshing spiral gears at the side where the gears move into meshing engagement toward one end of the pump chamber. The gear teeth form a seal between the inlet and discharge ports 25 and 26 and force the compacted material through the extrusion die 28 in the form of a long continuous shape designated S. Since the powdered plastic material is forced axially of the gears and not around the gear peripheries, it is compacted with progressively increasing pressure in a substantially continuous operation to avoid discontinuity in the resulting extrusion. Moreover, the material is moved through only a very short distance from the inlet to the discharge port so that the material is not subjected to a large amount of shear during compaction.

I claim:

1. An apparatus for compacting and extruding powdered plastic materials comprising, a pump casing defining a pump chamber, a pair of spiral gear members in said pump chamber having spiral gear teeth disposed in meshing engagement, means including a drive shaft connected to at least one gear member for rotating the gear members in relatively opposite directions whereby the teeth on the gear members move into meshing engagement at one side of a plane through the axes of the gear members and move out of meshing engagement at the other side of that plane, said casing having inlet and discharge openings each communicating with said pump chamber at said one side of said plane adjacent the mesh point of the gear members, said inlet and discharge openings being spaced apart longitudinally of said chamber a distance substantially less than the lead of said spiral gear teeth, said casing extending into close running fit with the teeth on said gear members around each said inlet and discharge openings to provide a pump seal between the inlet and discharge openings and to prevent material from flowing circumferentially around the gear members whereby material from the inlet is fed axially by the gear members at said one side of said plane toward said outlet.

2. An apparatus for compacting and extruding powdered plastic materials comprising, a pump casing having a pair of intersecting bores defining a pump chamber, a pair of spiral gear members in said bores having spiral gear teeth disposed in meshing engagement, drive means operatively connected to at least one gear member for rotating the gear members in relatively opposite directions whereby the teeth move into meshing engagement at one side of a plane through the axes of the gear members and out of meshing engagement at the other side of said plane, said casing having inlet and discharge openings each communicating with said pump chamber at said one side of said plane adjacent the mesh point of the gear members, said inlet and discharge openings being spaced apart longitudinally of said chamber a distance substantially less than the lead of said spiral gear teeth, said casing extending into close running fit with the teeth on said gear members around said inlet and discharge openings to provide a pumping seal between the inlet and discharge openings and to prevent material from flowing circumferentially around the gear members whereby material from the inlet is fed axially by the gear members at said one side of said plane toward said outlet.

3. An apparatus for compacting and extruding powdered plastic materials comprising, a pump casing having a pair of intersecting bores and end walls at opposite ends of the bores defining a pump chamber, a pair of spiral gear members in said bores having spiral gear teeth disposed in meshing engagement, drive means operatively connected to at least one of said gear members for rotating the gear members in relatively opposite directions whereby the teeth move into meshing engagement at one side of a plane through the axes of the gear members and out of meshing engagement at the other side of said plane, said casing having an inlet opening intersecting said bores at said one side of said plane and spaced axially from one of said end walls a distance substantially less than the lead of said spiral gear teeth, said gear members being operative to advance powdered plastic material from said inlet opening at said one side of said plane toward said one end wall, said one end wall having a discharge opening therein communicating with said pump bores at said one side of said plane and adjacent the mesh point of the gears for delivering compacted plastic material.

4. The combination of claim 3 wherein said gear teeth have a helix angle of about 45°.

References Cited in the file of this patent

UNITED STATES PATENTS

| | | |
|---|---|---|
| 1,516,968 | Johnson | Nov. 25, 1924 |
| 2,550,226 | Colombo | Apr. 24, 1951 |
| 2,829,399 | Caracciolo et al. | Apr. 8, 1958 |

FOREIGN PATENTS

| | | |
|---|---|---|
| 750,509 | Germany | Jan. 19, 1945 |
| 392,706 | Germany | Mar. 24, 1924 |